(12) United States Patent
Jiang

(10) Patent No.: US 12,141,575 B2
(45) Date of Patent: Nov. 12, 2024

(54) METHOD FOR UPGRADING CPLD AND CPLD UPGRADING SYSTEM, AND COMPUTER-READABLE STORAGE MEDIUM

(71) Applicant: SUZHOU METABRAIN INTELLIGENT TECHNOLOGY CO., LTD., Jiangsu (CN)

(72) Inventor: Bo Jiang, Jiangsu (CN)

(73) Assignee: SUZHOU METABRAIN INTELLIGENT TECHNOLOGY CO., LTD., Jiangsu (CN)

( * ) Notice: Subject to any disclaimer, the term of this patent is extended or adjusted under 35 U.S.C. 154(b) by 0 days.

(21) Appl. No.: 18/692,785

(22) PCT Filed: May 26, 2022

(86) PCT No.: PCT/CN2022/095377
§ 371 (c)(1),
(2) Date: Mar. 15, 2024

(87) PCT Pub. No.: WO2023/130649
PCT Pub. Date: Jul. 13, 2023

(65) Prior Publication Data
US 2024/0264823 A1 Aug. 8, 2024

(30) Foreign Application Priority Data
Jan. 6, 2022 (CN) .......................... 202210007572.7

(51) Int. Cl.
*G06F 9/445* (2018.01)
*G06F 1/3203* (2019.01)
(Continued)

(52) U.S. Cl.
CPC .............. *G06F 8/65* (2013.01); *G06F 1/3203* (2013.01)

(58) Field of Classification Search
CPC ...... G06F 8/65; G06F 1/3203; G06F 13/4004; G06F 1/28; G06F 13/4282; G06F 13/4291; G05B 19/042
See application file for complete search history.

(56) References Cited

U.S. PATENT DOCUMENTS 10,860,305 B1 * 12/2020 Harland .............. H03K 19/177
2015/0339118 A1 11/2015 Xu

FOREIGN PATENT DOCUMENTS

| CN | 109408088 A | 3/2019 |
| CN | 110096291 A | 8/2019 |

(Continued)

OTHER PUBLICATIONS

Chinese Search Report issued for Chinese Patent Application No. 202210007572.7 dated Feb. 16, 2022, without English translation.
(Continued)

*Primary Examiner* — Thuy Dao
(74) *Attorney, Agent, or Firm* — Merchant & Gould P.C.

(57) ABSTRACT

Provided are a method for upgrading the CPLD and a CPLD upgrading system, and a computer-readable storage medium. The system includes a baseboard management controller, a master CPLD and a slave CPLD, the master CPLD sends a power control signal to the controller through the slave CPLD, in response to determining that the master CPLD has completed upgrade preparation, the baseboard management controller setting the upgrade-effective signal to an enabled state, to make the slave CPLD lock a current power control signal, and use the current power control signal to control the controller (S101); controlling the master CPLD to perform CPLD upgrade (S102); and when the master CPLD has completed the CPLD upgrade, setting the upgrade-effective signal to a disabled state, to make the slave CPLD release the current power control signal, and use (Continued)

the power control signal sent by the master CPLD to control the controller (S103).

20 Claims, 4 Drawing Sheets

(51) Int. Cl.
 *G06F 8/65* (2018.01)
 *G06F 9/24* (2006.01)
 *G06F 9/455* (2018.01)
 *G06F 12/00* (2006.01)

(56) References Cited

FOREIGN PATENT DOCUMENTS

| | | | |
|---|---|---|---|
| CN | 110673867 | A | 1/2020 |
| CN | 210666783 | U | 6/2020 |
| CN | 111399879 | A | 7/2020 |
| CN | 113157618 | A | 7/2021 |
| CN | 113220324 | A | 8/2021 |
| CN | 113687842 | A | 11/2021 |
| CN | 114035831 | A | 2/2022 |

OTHER PUBLICATIONS

First Office Action issued for Chinese Patent Application No. 202210007572.7 dated Feb. 23, 2022, with English translation.
International Search Report and Written Opinion issued for International Application No. PCT/CN2022/095377 mailed Sep. 27, 2022 with English translation of Search Report.

\* cited by examiner

METHOD FOR UPGRADING CPLD AND CPLD UPGRADING SYSTEM, AND COMPUTER-READABLE STORAGE MEDIUM

CROSS-REFERENCE TO RELATED APPLICATION

The present application is a National Stage Application of PCT International Application No.: PCT/CN2022/095377 filed on May 26, 2022, which claims priority to Chinese Patent Application 202210007572.7, filed in the China National Intellectual Property Administration on Jan. 6, 2022, the disclosure of which is incorporated herein by reference in its entirety.

TECHNICAL FIELD

The present disclosure relates to the field of servers, and to a method for upgrading CPLD and a CPLD upgrading system, and a computer-readable storage medium.

BACKGROUND

A Complex Programmable Logic Device (CPLD) is also referred to as a complex programmable logic device, and the function thereof includes performing power control on controllers on a server main board and a memory. In the related art, the CPLD is generally upgraded under the control of a Baseboard Management Controller (BMC), and the inventor has realized that a restart stage will be experienced during upgrade, and at this time, power control cannot be performed, which causes the problem that a related controller is powered off and then powered on, thereby affecting normal operation of a server host.

SUMMARY

Some embodiments of the present disclosure provide a method for upgrading the CPLD and a CPLD upgrading system, and a computer-readable storage medium.

Some embodiments of the present disclosure provide a method for upgrading CPLD, which is applied to a CPLD upgrading system, wherein the CPLD upgrading system includes a baseboard management controller, a master CPLD and a slave CPLD, the master CPLD sends a power control signal to a controller through the slave CPLD, and an upgrade-effective signal is provided between the baseboard management controller and the slave CPLD, the method includes:
  in response to determining that the master CPLD has completed upgrade preparation, the setting, by baseboard management controller, the upgrade-effective signal to an enabled state, to make the slave CPLD lock a current power control signal, and use the current power control signal to control the controller;
  controlling the master CPLD to perform CPLD upgrade; and
  in response to determining the master CPLD has completed the CPLD upgrade, setting the upgrade-effective signal to a disabled state, to make the slave CPLD release the current power control signal, and use the power control signal sent by the master CPLD to control the controller.

In some embodiments, setting the upgrade-effective signal to the enabled state includes:
  setting the upgrade-effective signal to a high level; and setting the upgrade-effective signal to the disabled state includes:
  setting the upgrade-effective signal to a low level.

In some embodiments, controlling the master CPLD to perform the CPLD upgrade includes:
  Writing, by the baseboard management controller, a new firmware of the master CPLD into a memory of the master CPLD, and sending a restart command to the master CPLD in response to completing the writing; and
  in response to receiving the restart command, the master CPLD restarting to read the new firmware from the memory, and completing the CPLD upgrade.

In some embodiments, before the baseboard management controller determines that the master CPLD has completed the upgrade preparation, the method further including:
  sending, by the baseboard management controller, a pre-upgrade signal to the master CPLD;
  in response to receiving the pre-upgrade signal, storing, by the master CPLD, current operation state information, and sending a storage completion signal to the baseboard management controller after completing the storage; and
  determining, by the baseboard management controller, that the master CPLD has completed the upgrade preparation includes:
    in response to receiving the storage completion signal, determining, by the baseboard management controller, that the master CPLD has completed the upgrade preparation.

In some embodiments, before determining that the master CPLD has completed the upgrade, the method further including:
  in response to completing the CPLD upgrade, extracting, by the master CPLD, the current operation state information, and jumping to an operation state corresponding to the current operation state information;
  sending an initialization completion signal to the baseboard management controller after completing the jumping;
  determining that the master CPLD has completed the CPLD upgrade includes:
    in response to receiving the initialization completion signal, the baseboard management controller determining that the master CPLD has completed the CPLD upgrade.

In some embodiments, the CPLD upgrading system further includes a non-volatile memory connected to the master CPLD; and storing the current operation state information includes: storing, by the master CPLD, the current operation state information into the non-volatile memory.

In some embodiments, the non-volatile memory is a Serial Peripheral Interface (SPI) flash memory.

Some embodiments of the present disclosure further provide a CPLD upgrading system includes: a baseboard management controller, a master CPLD and a slave CPLD, wherein the master CPLD sends a power control signal to the controller through the slave CPLD, and an upgrade-effective signal is provided between the baseboard management controller and the slave CPLD, wherein
  the baseboard management controller is configured to set the upgrade-effective signal to an enabled state in response to determining that the master CPLD has completed upgrade preparation; control the master CPLD to perform CPLD upgrade; and set the upgrade-effective signal to a disabled state in response to determining that the master CPLD has completed the CPLD upgrade;

the master CPLD is configured to perform the CPLD upgrade under the control of the baseboard management controller; and the slave CPLD is configured to lock a current power control signal in response to determining that the upgrade-effective signal is the enabled state, and use the current power control signal to control the controller; and release the current power control signal in response to determining that the upgrade-effective signal is the disabled state, and use the power control signal sent by the master CPLD to control the controller.

In some embodiments, the baseboard management controller is further configured to set the upgrade-effective signal to a high level in response to determining that the master CPLD has completed the upgrade preparation; and set the upgrade-effective signal to a low level in response to determining that the master CPLD has completed the upgrade preparation.

In some embodiments, further provided is a computer device, the computer device includes a memory and at least one processor; wherein the memory stores computer-readable instructions, which, when executed by the processors, cause the at least one processor to execute the method for upgrading the CPLD according to any one above.

In some embodiments, some embodiments of the present disclosure further provide at least one non-transitory storage media storing computer-readable instructions, which, when executed by at least one processor, cause the at least one processor to execute the steps of the method for upgrading the CPLD according to any one above.

Details of at least one embodiment of the present disclosure are proposed in the accompanying drawings and the description below. Other features and advantages of some embodiments of the present disclosure will become apparent from the description, the accompanying drawings and the claims.

BRIEF DESCRIPTION OF THE DRAWINGS

In order to describe the methods in the embodiments of the present disclosure or in the related art more clearly, hereinafter, accompanying drawings requiring to be used for describing the embodiments or the related art are introduced briefly. Apparently, the accompanying drawings in the following description merely relate to embodiments of the present disclosure, and for a person of ordinary skill in the art, other accompanying drawings can also be obtained according to the provided accompanying drawings without involving any inventive effort.

DETAILED DESCRIPTION OF THE EMBODIMENTS

To make the objects, methods and advantages of the embodiments of the present disclosure clearer, hereinafter, the methods in embodiments of the present disclosure will be described clearly and thoroughly in combination with the accompanying drawings in the embodiments of the present disclosure. Apparently, the embodiments as described are merely a part rather than all of the embodiments of the present disclosure. All other embodiments obtained by a person of ordinary skill in the art on the basis of the embodiments of the present disclosure without any inventive effort shall all fall within the scope of protection of the present disclosure.

Figure 1:
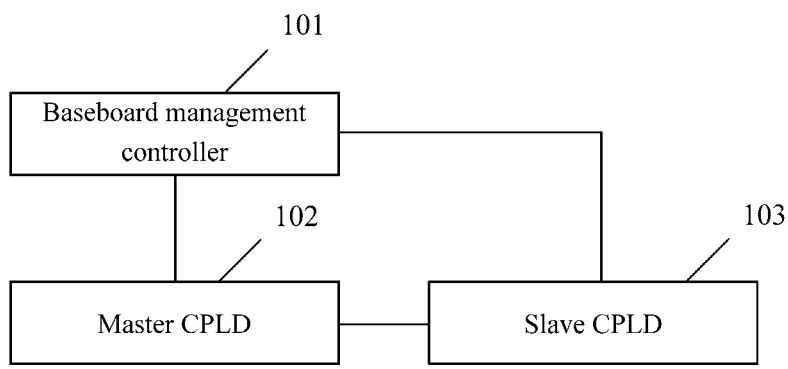
FIG. 1 is a structural block diagram of a CPLD upgrading system according to at least one embodiment of the disclosure.

A CPLD is generally upgraded under the control of a Baseboard Management Controller (BMC), and a restart stage will be experienced during upgrade, and at this time, power control cannot be performed, which causes the problem that a related controller is powered off and then powered on, thereby affecting normal operation of a server host. In view of this, some embodiments of the present disclosure provide a method for upgrading the CPLD, which can maintain a power control signal finally sent by a master CPLD to a controller when the master CPLD is upgraded, to maintain normal operation of a server. For ease of understanding, first, a CPLD upgrading system to which the present method is applicable is briefly introduced. Refer to FIG. 1, FIG. 1 is a structural block diagram of a CPLD upgrading system provided according to embodiments of the present disclosure. The CPLD upgrading system comprises a baseboard management controller 101, a master CPLD 102 and a slave CPLD 103, wherein the master CPLD 102 sends a power control signal to the controller through the slave CPLD 103, and an upgrade-effective signal is provided between the baseboard management controller 101 and the slave CPLD. It should be noted that, the embodiments of the present disclosure do not limit the controller, for example, the controller may be a main board controller, and may also be a storage device controller, and reference can be made to related technologies of servers. Embodiments of the present disclosure also do not limit the power control signal, as long as the signal can perform power control on a related controller, and reference can be made to related technologies of General-purpose input/output (GPIO). It should be noted that, the upgrade-effective signal is configured to control the slave CPLD to start to work, and the signal contains an enabled state and a disabled state, and for uses and signal values thereof, reference can be made to illustration in subsequent embodiments.

Figure 2:
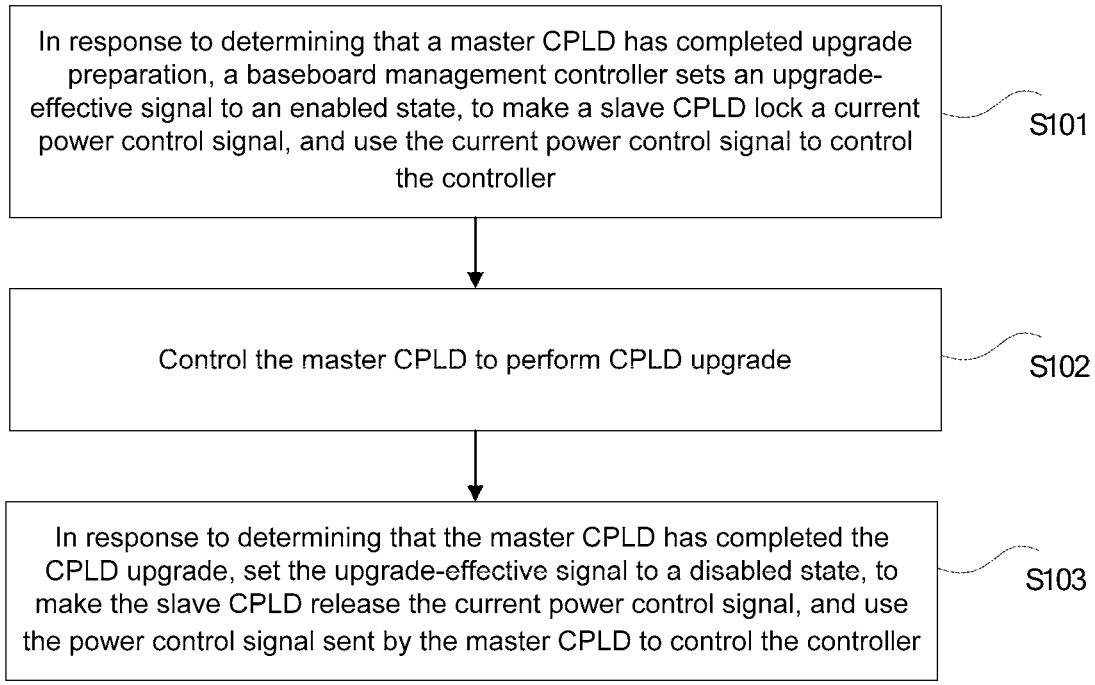
FIG. 2 is a flowchart of a method for upgrading the CPLD according to at least one embodiment of the disclosure.

On the basis of the described system description, hereinafter, an embodiment of the present method will be introduced. Refer to FIG. 2, FIG. 2 is a flowchart of a method for upgrading the CPLD provided according to embodiments of the present disclosure. The method includes:

At step of S101, in response to determining that the master CPLD has completed upgrade preparation, setting, by the baseboard management controller, the upgrade-effective signal to an enabled state, to make the slave CPLD lock a current power control signal, and use the current power control signal to control the controller.

In the embodiments of the present disclosure, the slave CPLD is configured to lock a power control signal finally sent by the master CPLD when the master CPLD is upgraded, to maintain a power control state of the controller when the master CPLD restarts; and in normal situations, the slave CPLD only performs transparent transmission on power control signals sent by the master CPLD. In the embodiments of the present disclosure, the reason why power control signals are separately locked is that such signals usually play a crucial role in operation of a server; and other non-power control signals do not need to be locked, as they do not affect the normal operation of an X86 operating system of a main board even if the signal state is out of order; in addition, the power control signals occupy a very small part of all GPIO signals of the whole CPLD, and there are generally 30 to 50 power control signals; and non-power control signals are consumers with the maximum CPLD GPIO. Therefore, separate locking of the power control signals does not significantly increase the manufacturing cost of the CPLD. In an embodiment, as the upgrade process of the master CPLD is initiated by the baseboard management controller, when determining that the master CPLD has completed the upgrade preparation, the baseboard management controller sets the upgrade-effective signal to the enabled state, to start a locking state of the slave CPLD; and when determining that the signal is in the enabled state, the slave CPLD will lock a power control signal currently received thereby, until the signal changes to a disabled state.

It should be noted that, the embodiments of the present disclosure do not limit signal values respectively corresponding to the enabled state and the disabled state, for example, the enabled state and the disabled state are respectively a high level and a low level, and the enabled state and the disabled state may also be respectively a low level and a high level. As a GPIO signal sent by the baseboard management controller is usually in an enabled state at a high level, for the convenience of management, the enabled state of the upgrade-effective signal may also be set to a high level.

In an embodiment, setting the upgrade-effective signal to the enabled state includes:

At step of 11: setting the upgrade-effective signal to a high level.

It should be noted that, the embodiments of the present disclosure do not limit the setting form of the upgrade-effective signal in the baseboard management controller, and reference may be made to related technologies of GPIO.

Further, the embodiments of the present disclosure do not limit how the baseboard management controller determines that the master CPLD has completed the upgrade preparation, for example, the baseboard management controller may send a pre-upgrade signal to the master CPLD, so that the master CPLD performs the upgrade preparation, and may return a signal indicating that the upgrade preparation has been completed to the baseboard management controller after the preparation has been completed; and in response to receiving the signal indicating that the upgrade preparation has been completed, the baseboard management controller determines that the master CPLD has completed the upgrade preparation. The embodiments of the present disclosure do not limit how the master CPLD performs the upgrade preparation, and reference can be made to related technologies of CPLD upgrade.

At step of S102, the master CPLD is controlled to perform CPLD upgrade.

It should be noted that, the embodiments of the present disclosure do not limit a process in which the baseboard management controller controls the master CPLD to perform the CPLD upgrade, and reference may be made to related technologies of CPLD upgrade. Simply speaking, the baseboard management controller can write a new firmware of the master CPLD into a memory thereof by using a Background mode (background upgrade), and send a restart command to the master CPLD after completing the writing; and the master CPLD restarts in response to receiving the restart command, to refresh the memory to read a new firmware file and initialize the new firmware file. In an embodiment, the restart command may be transmitted through an upgrade channel (JTAG, Joint Test Action Group), and the form thereof may refer to related technologies of a JTAG protocol.

In an embodiment, the step that the master CPLD is controlled to perform the CPLD upgrade includes:

At step of 21: writing, by the baseboard management controller, a new firmware of the master CPLD into a memory of the master CPLD, and sending a restart command to the master CPLD in response to completing the writing; and At step of 22: in response to receiving the restart command, the master CPLD restarts to read the new firmware from the memory, and completes the CPLD upgrade.

Of course, the baseboard management controller usually performs firmware writing in the Background mode, that is, old codes of the master CPLD are still in operation in the firmware writing process, and thus in order to increase the upgrade efficiency, the step 22 may also be completed before the step S101.

At step of S103, in response to determining that the master CPLD has completed the CPLD upgrade, setting the upgrade-effective signal to a disabled state, to make the slave CPLD release the current power control signal, and use the power control signal sent by the master CPLD to control the controller.

Correspondingly, when it is determined that the master CPLD has completed the CPLD upgrade, the baseboard management controller will set the upgrade-effective signal to the disabled state, so that the slave CPLD releases the current power control signal, and transfers the control right of the controller to the master CPLD. In an embodiment, the upgrade-effective signal is in the enabled state at the high level, and thus the low level is the disabled state.

In an embodiment, setting the upgrade-effective signal to a disabled state includes:

At step of step 31: setting the upgrade-effective signal to a low level.

Further, it should be noted that, the embodiments of the present disclosure do not limit how the baseboard management controller determines whether the master CPLD has completed the CPLD upgrade. For example, it may be that the baseboard management controller actively monitors an upgrade state of the master CPLD; and it may also be that an initialization completion signal is sent to the baseboard management controller after the master CPLD has completed initialization, and in response to receiving the signal, the baseboard management controller determines that the master CPLD has completed the CPLD upgrade. In the embodiments of the present disclosure, in order to increase the resource utilization rate, the way for the baseboard management controller determining that the master CPLD has completed the CPLD upgrade may be: in response to completing the initialization, the master CPLD sends an initialization completion signal to the baseboard management controller, and in response to receiving the signal, the baseboard management controller determines that the master CPLD has completed the CPLD upgrade.

On the basis of the described embodiments, the slave CPLD is additionally provided in the CPLD upgrading system of some embodiments of the present disclosure, wherein the master CPLD sends the power control signal to the controller through the slave CPLD, and the upgrade-effective signal is provided between the baseboard management controller and the slave CPLD. In the process of performing CPLD upgrade, when the baseboard management controller determines that the master CPLD has completed the upgrade preparation, the upgrade-effective signal will be set to the enabled state, to control the slave CPLD to lock a power control signal currently sent by the master CPLD, and the signal is configured to maintain power control on the related controller; and when the baseboard management controller determines that the master CPLD has completed the CPLD upgrade, the upgrade-effective signal will be set to the disabled state, to control the slave CPLD to release previous power control signals, and re-use the power control signal sent by the master CPLD to perform power control on the related controller. In other words, in some embodiments of the present disclosure, the separate slave CPLD is configured to record power control signals sent by the master CPLD, and maintain the power control signal finally sent by the master CPLD when the master CPLD is upgraded, to prevent the related controller from being powered off and then powered on, thereby being able to ensure normal operation of the server in the process of upgrading the master CPLD.

On the basis of the described embodiments, in order to increase the speed of the master CPLD restoring from the upgrade state to a working state, and to further reduce perception of the upgrade process of master CPLD by the controller controlled by the master CPLD, before the upgrade, the master CPLD can also store the current operation state thereof, to quickly restore to the original operation state after upgrade initialization. In an embodiment, before the baseboard management controller determines that the master CPLD has completed the upgrade preparation, the method further including:

At step of S201, the baseboard management controller sends a pre-upgrade signal to the master CPLD.

In the embodiments of the present disclosure, the pre-upgrade signal is configured to notify the master CPLD to start the upgrade preparation. It should be noted that, the embodiments of the present disclosure do not limit the form of the pre-upgrade signal, and reference can be made to related technologies of GPIO.

At step of S202, in response to receiving the pre-upgrade signal, the master CPLD stores current operation state information, and sends a storage completion signal to the baseboard management controller after completing the storage.

In an embodiment, a state machine related to power control usually runs on the master CPLD, and the current operation state information is a corresponding state of the state machine when the master CPLD receives the pre-upgrade signal. For content of the current operation state information, reference can be made to related technologies of CPLD. It should be noted that, the embodiments of the present disclosure do not limit the storage position of the current operation state information, which can be set according to practical application requirements. In an embodiment, in order to avoid loss of the operation state information due to power failure, the current operation state information can be stored in a non-volatile memory connected to the master CPLD, that is, the CPLD upgrading system can further include the non-volatile memory.

In an embodiment, the CPLD upgrading system further includes the non-volatile memory connected to the master CPLD; and the step that the current operation state information is stored, may include:

At step of 41: the master CPLD stores the current operation state information into the non-volatile memory.

It should be noted that, the embodiments of the present disclosure do not limit the non-volatile memory, for example, the memory may be an Electrically Erasable Programmable Read Only Memory (EEPROM), and may also be an Serial Peripheral Interface Bus (SPI) flash memory. In an embodiment, the non-volatile memory may be an SPI flash memory.

Further, it should be noted that, the embodiments of the present disclosure do not limit the form of the storage completion signal, and reference may be made to related technologies of GPIO.

Correspondingly, the baseboard management controller determines that the master CPLD has completed the upgrade preparation includes:

At step of S203, in response to receiving the storage completion signal, the baseboard management controller determines that the master CPLD has completed the upgrade preparation.

Before the upgrade, the master CPLD caches operation state information, and thus after the upgrade, the master CPLD can read the operation state information and jump to a corresponding operation state.

In an embodiment, before determining that the master CPLD has completed the upgrade, the method further including:

At step of S301, in response to completing the CPLD upgrade, the master CPLD extracts the current operation state information, and jumps to an operation state corresponding to the current operation state information; and At step of S302, an initialization completion signal is sent to the baseboard management controller after completing the jumping.

Definitely, if the master CPLD does not store the current operation state information, for example, the related state machine does not run, and there is no corresponding operation state information, when extracting the current operation state information and determining that the information cannot be extracted, the master CPLD still sends the initialization completion signal to the baseboard management controller.

It should be noted that, the embodiments of the present disclosure do not limit the form of the initialization completion signal, and reference may be made to related technologies of GPIO.

Correspondingly, the step that it is determined that the master CPLD has completed the CPLD upgrade includes:

At step of S303, in response to receiving the initialization completion signal, the baseboard management controller determines that the master CPLD has completed the CPLD upgrade.

Figure 3:
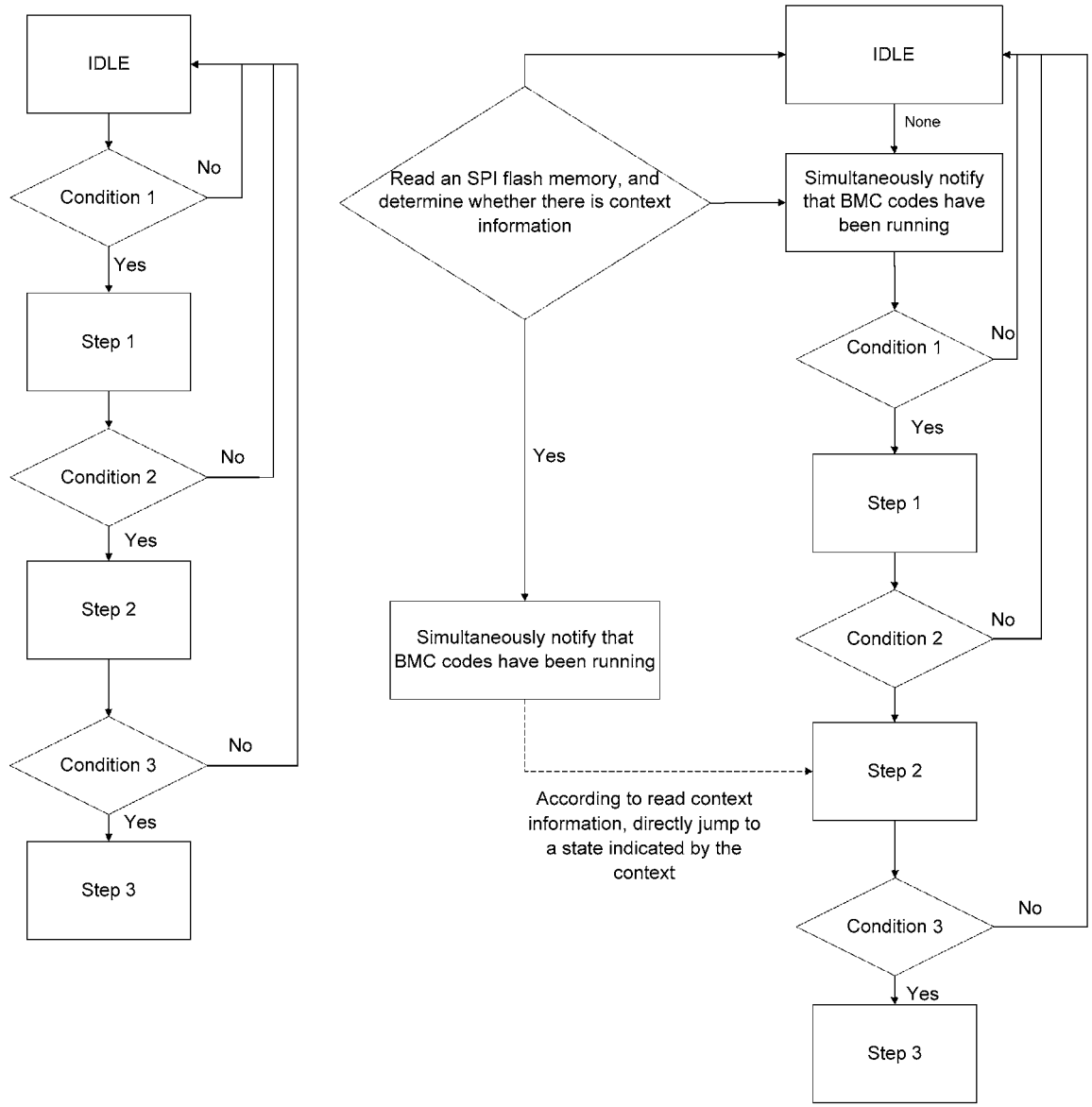
FIG. 3 is a comparison diagram of state value recovery according to at least one embodiment of the disclosure.

In an embodiment, refer to FIG. 3, FIG. 3 is a comparison diagram of state value recovery provided according to embodiments of the present disclosure. The left half is a schematic diagram of operation a state machine after upgrade of an existing CPLD, and the right half is a schematic diagram of operation of a state machine after upgrade of the master CPLD in the present method. Hence, as there is no cache, after the upgrade, the existing CPLD can only rerun the state machine from an IDLE state, which easily causes the related controller to perceive the upgrade situation of the CPLD; however, in some embodiments of the present disclosure, the SPI flash memory is configured to cache the current operation state information (i.e. context information) before upgrade, and thus after upgrade, the information can be directly read from the SPI flash memory, and a corresponding operation state is jumped to, so that perception of CPLD upgrade by the related controller can be further reduced.

On the basis of the described embodiments, in some embodiments of the present disclosure, in order to increase the speed of the master CPLD restoring from the upgrade state to a working state, before upgrade, the master CPLD may also be controlled to store the current operation state thereof, to quickly return to the original operation state after upgrade initialization, thereby further reducing the perception of the upgrade process of the master CPLD by the controller controlled by the master CPLD.

Figure 4:
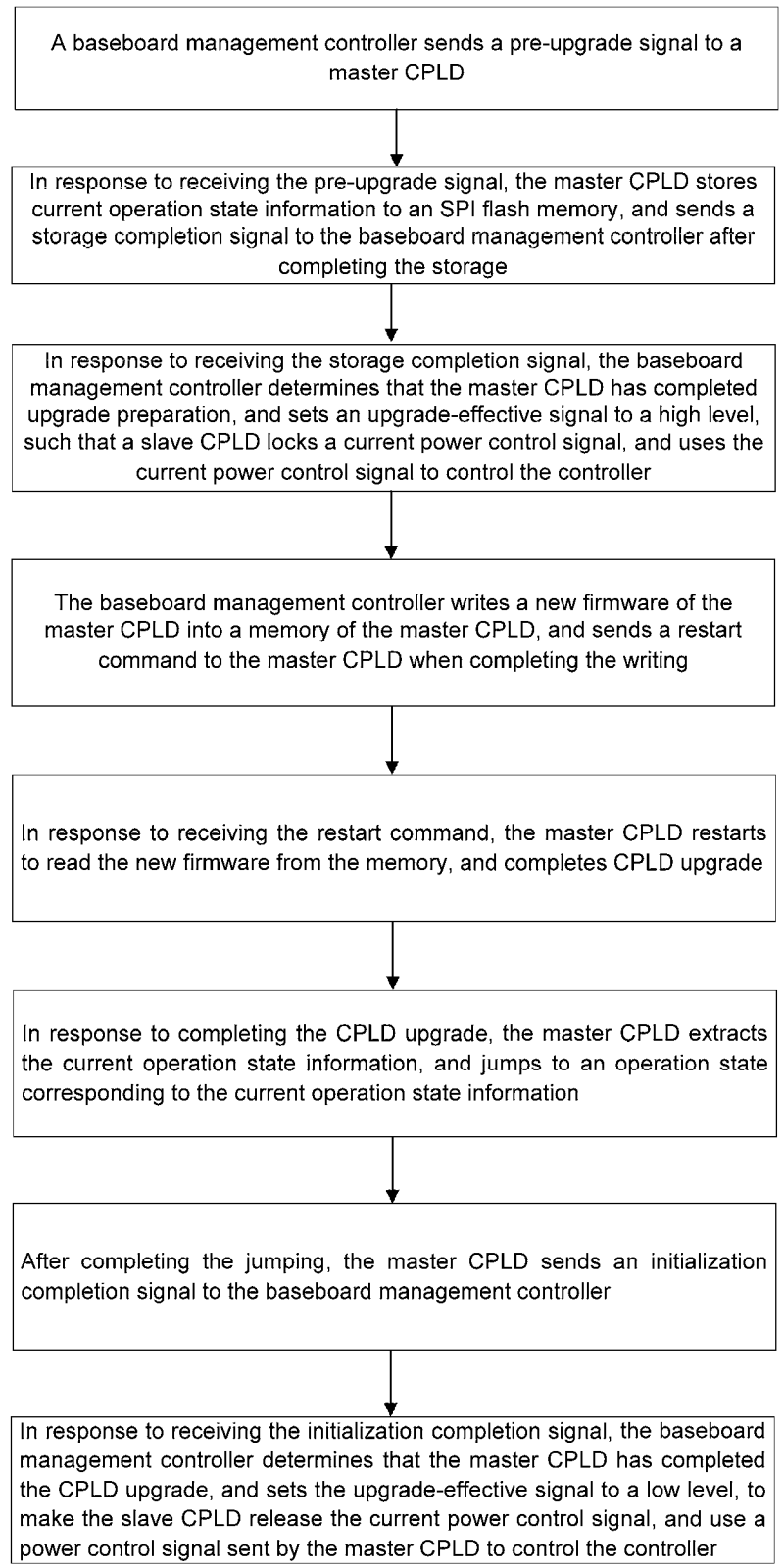
FIG. 4 is a flowchart of another method for upgrading the CPLD according to at least one embodiment of the disclosure.

Hereinafter, the present CPLD upgrade method will be introduced on the basis of a flowchart. Refer to FIG. 4, FIG. 4 is a flowchart of another method upgrading CPLD provided according to embodiments of the present disclosure. The flow may include:
1. the baseboard management controller sends a pre-upgrade signal to the master CPLD;
2. in response to receiving the pre-upgrade signal, the master CPLD stores current operation state information to an SPI flash memory, and sends a storage completion signal to the baseboard management controller after completing the storage;
3. in response to receiving the storage completion signal, the baseboard management controller determines that the master CPLD has completed upgrade preparation, and sets an upgrade-effective signal to a high level, to make the slave CPLD lock a current power control signal, and use the current power control signal to control the controller;
4. the baseboard management controller writes a new firmware of the master CPLD into a memory of the master CPLD, and sends a restart command to the master CPLD when completing the writing;
5. in response to receiving the restart command, the master CPLD restarts to read the new firmware from the memory, and completes CPLD upgrade;
6. in response to completing the CPLD upgrade, the master CPLD extracts the current operation state information, and jumps to an operation state corresponding to the current operation state information;
7. after completing the jumping, the master CPLD sends an initialization completion signal to the baseboard management controller; and
8. in response to receiving the initialization completion signal, the baseboard management controller determines that the master CPLD has completed the CPLD upgrade, and sets the upgrade-effective signal to a low level, to make the slave CPLD release the current power control signal, and use a power control signal sent by the master CPLD to control the controller.

Some embodiments of the present disclosure provide a method for upgrading the CPLD, which has the following beneficial effects: the slave CPLD is additionally provided in the CPLD upgrading system of some embodiments of the present disclosure, wherein the master CPLD sends the power control signal to the controller through the slave CPLD, and the upgrade-effective signal is provided between the baseboard management controller and the slave CPLD. In the process of performing CPLD upgrade, when the baseboard management controller determines that the master CPLD has completed the upgrade preparation, the upgrade-effective signal will be set to the enabled state, to control the slave CPLD to lock a power control signal currently sent by the master CPLD, and the signal is configured to maintain power control on the related controller; and when the baseboard management controller determines that the master CPLD has completed the CPLD upgrade, the upgrade-effective signal will be set to the disabled state, to control the slave CPLD to release previous power control signals, and re-use the power control signal sent by the master CPLD to perform power control on the related controller. In other words, in some embodiments of the present disclosure, the separate slave CPLD is configured to record power control signals sent by the master CPLD, and maintain the power control signal finally sent by the master CPLD when the master CPLD is upgraded, to prevent the related controller from being powered off and then powered on, thereby being able to ensure normal operation of the server in the process of upgrading the master CPLD.

Hereinafter, the CPLD upgrading system and a computer-readable storage medium provided according to embodiments of the present disclosure are introduced. The CPLD upgrading system and the computer-readable storage medium described below and the CPLD upgrade method described above can be referred to each other in a corresponding manner.

Refer to FIG. 1, the CPLD upgrading system includes: a baseboard management controller 101, a master CPLD 102 and a slave CPLD 103, wherein the master CPLD 102 sends a power control signal to the controller through the slave CPLD 103, and an upgrade-effective signal is provided between the baseboard management controller 101 and the slave CPLD 103, wherein the baseboard management controller 101 is configured to set the upgrade-effective signal to an enabled state when it is determined that the master CPLD 102 has completed upgrade preparation; the baseboard management controller 101 is configured to control the master CPLD 102 to perform CPLD upgrade; and set the upgrade-effective signal to a disabled state when it is determined that the master CPLD 102 has completed the CPLD upgrade;

the master CPLD 102 is configured to perform the CPLD upgrade under the control of the baseboard management controller 101; and the slave CPLD 103 is configured to lock a current power control signal when it is determined that the upgrade-effective signal is the enabled state, and use the current power control signal to control the controller; and release the current power control signal when it is determined that the upgrade-effective signal is the disabled state, and use the power control signal sent by the master CPLD 102 to control the controller.

In an embodiment, the baseboard management controller 101 is further configured to set the upgrade-effective signal to a high level when it is determined that the master CPLD 102 has completed the upgrade preparation; and the baseboard management controller 101 is further configured to set the upgrade-effective signal to a low level when it is determined that the master CPLD 102 has completed the upgrade preparation.

In an embodiment, the baseboard management controller 101 is further configured to write a new firmware of the master CPLD 102 into a memory of the master CPLD 102, and send a restart command to the master CPLD 102 when completing the writing; and the master CPLD 102 is further configured to restart in response to receiving the restart command, to read the new firmware from the memory, and to complete the CPLD upgrade.

In an embodiment, the baseboard management controller 101 is further configured to send a pre-upgrade signal to the master CPLD 102;

the master CPLD 102 is further configured to store current operation state information upon receiving the pre-upgrade signal, and send a storage completion signal to the baseboard management controller 101 after completing the storage; and correspondingly, the baseboard management controller 101 is further configured to determine that the master CPLD 102 has completed the upgrade preparation upon receiving the storage completion signal.

In an embodiment, the master CPLD 102 is further configured to extract, in response to completing the CPLD upgrade, the current operation state information, and jump to an operation state corresponding to the current operation state information; and the master CPLD 102 is further configured to send an initialization completion signal to the baseboard management controller 101 after completing the jumping; and correspondingly, the baseboard management controller 101 is further configured to determine that the master CPLD 102 has completed the CPLD upgrade in response to receiving the initialization completion signal.

Figure 5:
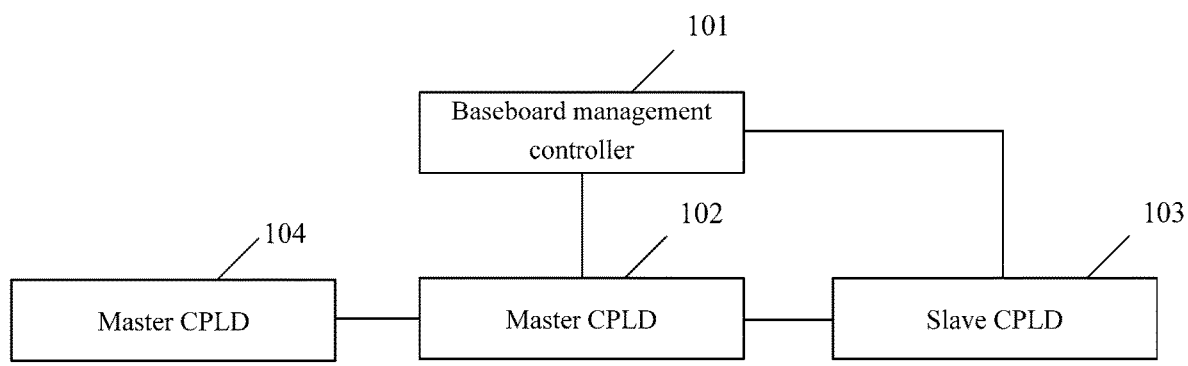
FIG. 5 is a structural block diagram of another CPLD upgrading system according to at least one embodiment of the disclosure.

In an embodiment, refer to FIG. 5, FIG. 5 is a structural block diagram of another CPLD upgrading system provided according to embodiments of the present disclosure. The CPLD upgrading system further comprises a non-volatile memory 104 connected to the master CPLD 102, wherein the master CPLD 102 is further configured to store the current operation state information into the non-volatile memory 104; and the non-volatile memory 104 is configured to store the current operation state information.

In an embodiment, the non-volatile memory 104 is an SPI flash memory.

Figure 6:
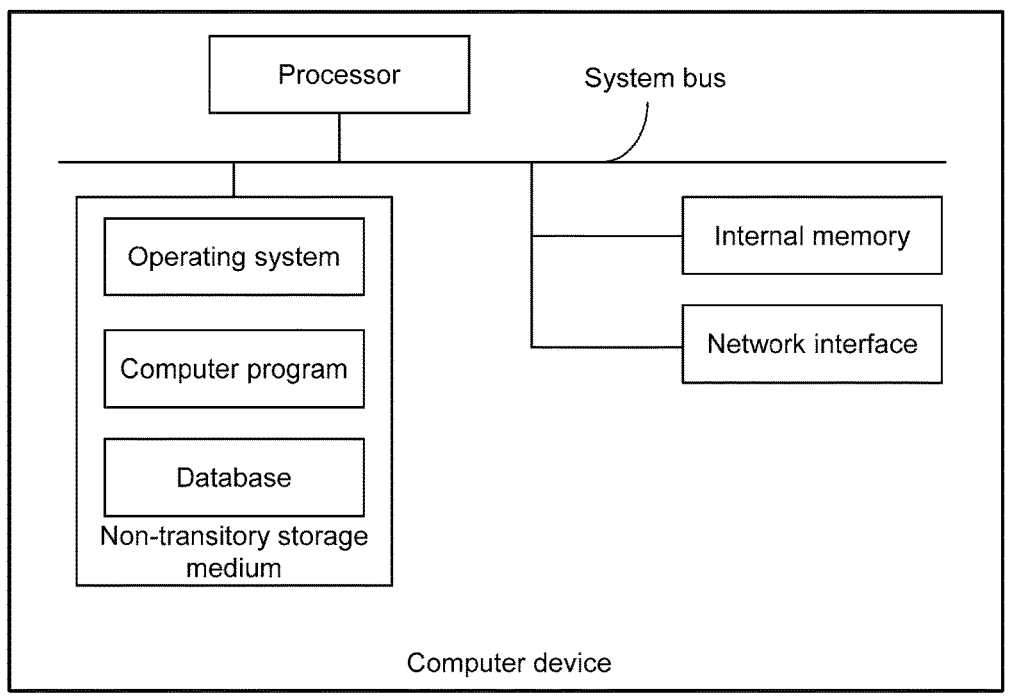
FIG. 6 is a structural block diagram of a computer device according to at least one embodiment of the disclosure.

Some embodiments of the present disclosure provide a computer device, the computer device may be a server, and an internal structure diagram thereof may be as shown in FIG. 6. The computer device includes a processor, a memory, a network interface and a database which are connected by a system bus. The processor of the computer device is configured to provide computing and control capabilities. The memory of the computer device includes a non-transitory storage medium and an internal memory. The non-transitory storage medium stores an operating system, a computer program and a database. The internal memory provides an environment for operation of the operating system and the computer program in the non-transitory storage medium. The database of the computer device is configured to store data in the described CPLD upgrade method. The network interface of the computer device is configured to communicate with an external terminal via network connection. The computer program is executed by the processor to implement the method for upgrading the CPLD.

Some embodiments of the present disclosure provide a computer device include: a memory and at least one processor; wherein the memory stores computer-readable instructions, which, when executed by the processors, cause the at least one processor to execute the steps of the method for upgrading the CPLD according to any one of the embodiments above.

Embodiments of the present description further provide at least one non-transitory storage media storing computer-readable instructions, which, when executed by at least one processor, cause the at least one processor to execute the steps of the method for upgrading the CPLD according to any one of the embodiments above.

The embodiments of the computer-readable storage medium part correspond to the embodiments of the CPLD upgrade method part; therefore, for the embodiments of the computer-readable storage medium part, reference may be made to the illustration of the embodiments of the CPLD upgrade method part, and they will not be repeated herein again.

Various embodiments in the description are described in a progressive manner. Each embodiment focuses on differences from other embodiments. For the same or similar parts among the embodiments, reference may be made to each other. For the apparatus disclosed in the embodiments, as the apparatus corresponds to the method disclosed in the embodiments, the illustration thereof is relatively simple, and for the related parts, reference can be made to the illustration of the method part.

A person of ordinary skill in the art would understand that all or some processes of the methods in the described embodiments may be completed by computer-readable instructions instructing related hardware. The computer-readable instructions may be stored in a non-transitory computer-readable storage medium. When executed, the computer-readable instructions may comprise the flow of the method embodiments above. Any references to memory, storage, database, or other media used in the embodiments provided in the present disclosure may include a non-transitory memory and/or a transitory memory. The non-transitory memory may include a read-only memory (ROM), a programmable ROM (PROM), an electrically programmable ROM (EPROM), an electrically erasable programmable ROM (EEPROM), or flash memory. The transitory memory may include a random access memory (RAM) or an external cache memory. By way of illustration rather than limitation, the RAM may be available in a variety of forms, such as static RAM (SRAM), dynamic RAM (DRAM), synchronous DRAM (SDRAM), double data rate SDRAM (DDRSDRAM), enhanced SDRAM (ESDRAM), synchronous link (Synchlink) DRAM (SLDRAM), memory bus (Rambus) direct RAM (RDRAM), direct memory bus dynamic RAM (DRDRAM), and memory bus dynamic RAM (RDRAM), etc.

Various technical features of the embodiments above can be combined in any way, and in order to make the description brief, all possible combinations of the technical features of the embodiments above are not described. However, as long as the combination of these technical features is not contradictory, the technical features should be considered to fall within the scope disclosed in the description.

The embodiments as described above merely represent several embodiments of the present disclosure, and the illustration thereof is detailed, but the detailed illustration cannot be understood as limiting the patent scope of the present disclosure. It should be noted that for a person of ordinary skill in the art, several modifications and improvements can be made without departing from the concept of the present disclosure, and all these modifications and improvements fall within the scope of protection of the present disclosure. Therefore, the patent scope of protection of the present disclosure shall be subject to the appended claims.

What is claimed is:

1. A method for upgrading a Complex Programmable Logic Device (CPLD), wherein the method is applied to a CPLD upgrading system, the CPLD upgrading system comprises a baseboard management controller, a master CPLD and a slave CPLD, the master CPLD sends a power control signal to the a controller through the slave CPLD, and an upgrade-effective signal is provided between the baseboard management controller and the slave CPLD, the method comprises:

in response to determining that the master CPLD has completed upgrade preparation, setting, by the baseboard management controller, the upgrade-effective signal to an enabled state, to make the slave CPLD lock a current power control signal, and use the current power control signal to control the controller;

controlling, by the baseboard management controller, the master CPLD to perform CPLD upgrade; and in response to determining that the master CPLD has completed the CPLD upgrade, setting, by the baseboard management controller, the upgrade-effective signal to a disabled state, to make the slave CPLD release the current power control signal, and use the power control signal sent by the master CPLD to control the controller.

2. The method for upgrading the CPLD as claimed in claim 1, wherein:

setting, by the baseboard management controller, the upgrade-effective signal to the enabled state comprises:
setting, by the baseboard management controller, the upgrade-effective signal to a high level;

setting, by the baseboard management controller, the upgrade-effective signal to the disabled state comprises:
setting, by the baseboard management controller, the upgrade-effective signal to a low level.

3. The method for upgrading the CPLD as claimed in claim 1, wherein controlling, by the baseboard management controller, the master CPLD to perform the CPLD upgrade comprises:

writing, by the baseboard management controller, a new firmware of the master CPLD into a memory of the master CPLD, and sending a restart command to the master CPLD in response to completing the writing; and in response to receiving the restart command, the master CPLD restarting to read the new firmware from the memory, and completing the CPLD upgrade.

4. The method for upgrading the CPLD as claimed in claim 3, wherein writing, by the baseboard management controller, the new firmware of the master CPLD into the memory of the master CPLD comprises:

writing, by the baseboard management controller, the new firmware of the master CPLD into the memory of the master CPLD in a Background mode.

5. The method for upgrading the CPLD as claimed in claim 3, wherein sending a restart command to the master CPLD in response to completing the writing comprises:

sending a restart command to the master CPLD through an upgrade channel in response to completing the writing.

6. The method for upgrading the CPLD as claimed in claim 1, wherein before the baseboard management controller determines that the master CPLD has completed the upgrade preparation, the method further comprising:

sending, by the baseboard management controller, a pre-upgrade signal to the master CPLD;

in response to receiving the pre-upgrade signal, storing, by the master CPLD, current operation state information, and sending a storage completion signal to the baseboard management controller after completing the storage;

determining, by the baseboard management controller, that the master CPLD has completed the upgrade preparation, comprises:

in response to receiving the storage completion signal, determining, by the baseboard management controller, that the master CPLD has completed the upgrade preparation.

7. The method for upgrading the CPLD as claimed in claim 6, wherein before determining that the master CPLD has completed the upgrade, the method further comprising:

in response to completing the CPLD upgrade, extracting, by the master CPLD, the current operation state information, and jumping to an operation state corresponding to the current operation state information;

sending an initialization completion signal to the baseboard management controller after completing the jumping;

determining that the master CPLD has completed the CPLD upgrade, comprises:

in response to receiving the initialization completion signal, determining, by the baseboard management controller, that the master CPLD has completed the CPLD upgrade.

8. The method for upgrading the CPLD as claimed in claim 6, wherein the CPLD upgrading system further comprises a non-volatile memory connected to the master CPLD; and storing the current operation state information comprises:

storing, by the master CPLD, the current operation state information into the non-volatile memory.

9. The method for upgrading the CPLD as claimed in claim 8, wherein the non-volatile memory is a Serial Peripheral Interface (SPI) flash memory.

10. A Complex Programmable Logic Device (CPLD) upgrading system, wherein the system comprises: a baseboard management controller, a master CPLD and a slave CPLD, wherein the master CPLD sends a power control signal to a controller through the slave CPLD, and an upgrade-effective signal is provided between the baseboard management controller and the slave CPLD, wherein;

the baseboard management controller, configured to set the upgrade-effective signal to an enabled state in response to determining that the master CPLD has completed upgrade preparation; control the master CPLD to perform CPLD upgrade; and set the upgrade-effective signal to a disabled state in response to determining that the master CPLD has completed the CPLD upgrade;

the master CPLD, configured to perform the CPLD upgrade under the control of the baseboard management controller;

the slave CPLD, configured to lock a current power control signal in response to determining that the upgrade-effective signal is the enabled state, and use the current power control signal to control the controller; and release the current power control signal in response to determining that the upgrade-effective signal is the disabled state, and use the power control signal sent by the master CPLD to control the controller.

11. The CPLD upgrading system as claimed in claim 10, wherein the baseboard management controller is further configured to set the upgrade-effective signal to a high level in response to determining that the master CPLD has completed the upgrade preparation; and set the upgrade-effective signal to a low level in response to determining that the master CPLD has completed the upgrade preparation.

12. At least one non-transitory storage media storing computer-readable instructions, wherein, when executed by at least one processor, cause the at least one processor to execute following actions:
   in response to determining that the master CPLD has completed upgrade preparation, set, by the baseboard management controller, the upgrade-effective signal to an enabled state, to make the slave CPLD lock a current power control signal, and use the current power control signal to control the controller;
   control, by the baseboard management controller, the master CPLD to perform CPLD upgrade; and
   in response to determining that the master CPLD has completed the CPLD upgrade, set, by the baseboard management controller, the upgrade-effective signal to a disabled state, to make the slave CPLD release the current power control signal, and use the power control signal sent by the master CPLD to control the controller.

13. The at least one non-transitory storage media storing computer-readable instructions as claimed in claim 12, wherein, when executed by at least one processor, cause the at least one processor to execute following actions:
   set, by the baseboard management controller, the upgrade-effective signal to a high level;
   set, by the baseboard management controller, the upgrade-effective signal to a low level.

14. The at least one non-transitory storage media storing computer-readable instructions as claimed in claim 12, wherein, when executed by at least one processor, cause the at least one processor to execute following actions:
   write, by the baseboard management controller, a new firmware of the master CPLD into a memory of the master CPLD, and send a restart command to the master CPLD in response to completing the writing; and
   in response to receiving the restart command, the master CPLD restarting to read the new firmware from the memory, and completing the CPLD upgrade.

15. The at least one non-transitory storage media storing computer-readable instructions as claimed in claim 14, wherein when executed by at least one processor, cause the at least one processor to execute following actions:
   write, by the baseboard management controller, the new firmware of the master CPLD into the memory of the master CPLD in a Background mode.

16. The at least one non-transitory storage media storing computer-readable instructions as claimed in claim 14, wherein when executed by at least one processor, cause the at least one processor to execute following actions:
   send a restart command to the master CPLD through an upgrade channel in response to completing the writing.

17. The at least one non-transitory storage media storing computer-readable instructions as claimed in claim 12, wherein, when executed by at least one processor, cause the at least one processor to execute following actions:
   send, by the baseboard management controller, a pre-upgrade signal to the master CPLD;
   in response to receiving the pre-upgrade signal, store, by the master CPLD, current operation state information, and send a storage completion signal to the baseboard management controller after completing the storage;
   determine, by the baseboard management controller, that the master CPLD has completed the upgrade preparation, comprises:
   in response to receiving the storage completion signal, determine, by the baseboard management controller, that the master CPLD has completed the upgrade preparation.

18. The at least one non-transitory storage media storing computer-readable instructions as claimed in claim 17, wherein, when executed by at least one processor, cause the at least one processor to execute following actions:
   in response to completing the CPLD upgrade, extract, by the master CPLD, the current operation state information, and jump to an operation state corresponding to the current operation state information;
   send an initialization completion signal to the baseboard management controller after completing the jumping;
   determine that the master CPLD has completed the CPLD upgrade, comprises:
   in response to receiving the initialization completion signal, determine, by the baseboard management controller, that the master CPLD has completed the CPLD upgrade.

19. The at least one non-transitory storage media storing computer-readable instructions as claimed in claim 17, wherein, when executed by at least one processor, cause the at least one processor to execute following actions:
   store, by the master CPLD, the current operation state information into the non-volatile memory.

20. The at least one non-transitory storage media storing computer-readable instructions as claimed in claim 19, wherein the non-volatile memory is the SPI flash memory.

* * * * *